United States Patent
Wagner et al.

[11] Patent Number: 6,103,041
[45] Date of Patent: Aug. 15, 2000

[54] REACTIVE INK PRINTING PROCESS

[76] Inventors: Barbara Wagner, 1477 Oaklanding Rd.; Ming Xu, 2808 Gaston Gate; Kimberlee Thompson, 1054 Anna Knapp Blvd. Apt 23D, all of Mount Pleasant, S.C. 29464

[21] Appl. No.: 09/374,144

[22] Filed: Aug. 12, 1999

Related U.S. Application Data

[63] Continuation of application No. 09/073,963, May 6, 1998, abandoned.

[51] Int. Cl.[7] ............................ B44C 1/165; B32B 31/00; B32B 27/14; B41M 31/00; C09J 31/00
[52] U.S. Cl. ........................... 156/230; 156/240; 156/247; 156/277; 156/289; 427/146; 427/148; 427/150; 428/195
[58] Field of Search ..................................... 156/230, 234, 156/235, 237, 239, 240, 241, 247, 277, 289; 428/195; 427/146, 147, 148, 150

[56] References Cited

U.S. PATENT DOCUMENTS

| | | |
|---|---|---|
| 4,058,644 | 11/1977 | DeVries . |
| 4,078,886 | 3/1978 | DeFago . |
| 4,605,418 | 8/1986 | Christie et al. . |
| 5,411,931 | 5/1995 | Kung . |
| 5,431,501 | 7/1995 | Hale et al. ........................ 400/120.02 |
| 5,470,818 | 11/1995 | Nakamura et al. . |
| 5,556,935 | 9/1996 | Traubel et al. . |
| 5,645,888 | 7/1997 | Titterington et al. . |
| 5,646,090 | 7/1997 | Tamura et al. . |
| 5,665,676 | 9/1997 | Nakamura et al. . |

*Primary Examiner*—Richard Crispino
*Assistant Examiner*—J. A. Lorengo
*Attorney, Agent, or Firm*—B. Craig Killough

[57] ABSTRACT

A method of printing an ink or meltable ink layer which comprises dyes or pigments or other colorants. The ink or ink melt layer comprises compounds with functional groups capable of reacting with active hydrogen, and compounds with functional groups containing active hydrogen, or functional groups capable of conversion to active hydrogen containing groups. An image is printed onto a substrate, at a relatively low temperature, so that the ink is not activated during the process of printing on to the medium. The image is subsequently transferred or permanently fixed on the substrate by the application of heat and pressure, which activates the ink, and bonds the colorant to the substrate. The reactive compounds may be blocked with blocking agents which are removed by the application of heat or other energy during activation of the ink.

13 Claims, 2 Drawing Sheets

REACTIVE INK PRINTING PROCESS

This is a continuation of application Ser. No. 09/073,963, filed May 6, 1998 now abandoned.

FIELD OF THE INVENTION

This invention relates to digital printing methods generally, and is more specifically directed to a method of digital printing of ink onto a substrate, and subsequently activating the ink to permanently fix the printed image.

BACKGROUND OF THE INVENTION

Words and designs are frequently printed onto clothing and other textile materials, as well as other objects. Common means of applying such designs to objects include the use of silk screens, and mechanically bonded thermal transfers. Silk screen process is well known in the art, and an example of a mechanical thermal process for textile materials is described in Hare, U.S. Pat. No. 4,244,358.

The use of digital computer technology allows a virtually instantaneous printing of images. For example, video cameras or scanning 2 may be used to capture an image to a computer 4. The image may then be printed by a computer driven printer, including thermal, ink jet and laser printers 6. Computer driven printers are readily available which will print in multiple colors. FIG. 1.

A process of thermal transfers wherein the ink mechanically bonds to the substrate is described in Hare, U.S. Pat. No. 4,773,953. The resulting mechanical image, as transferred, is a surface bonded image with a raised, plastic like feel to the touch. The resulting printed image is stiff to the feel, has poor dimensional stability when stretched and poor color range.

Conventional heat-melt thermal printing uses primarily non-active wax materials such as hydrocarbon wax, carnauba wax, ester wax, paraffin wax, etc. as heat-melt material. Though these wax or wax-like materials serve the purpose of heat-melt very well, they present problems when the product is used in a further transfer process, especially when the image is transferred to a fibrous material, such as a textile. The conventional wax materials are not chemically bonded or otherwise permanently bonded to the substrate, but are temporarily and loosely bound to the final substrate by the melting of wax during the transfer process. The resulting image is not durable, with the wax materials being washed away during laundering of textile substrates on which the image is transferred, particularly if hot water is used, along with the dyes or colorants which form the image in the thermal ink layer. Since, in most cases, the ink layer composition has a major percentage of wax or wax-like material, and the colorants used in such composition are either wax soluble and/or completely dispersed in wax material, the associated problems of poor wash fastness, color fastness, and poor thermal stability, of the final product result in rapid and severe image quality deterioration during the usage of the product.

Heat activated, or sublimation, transfer dye solids change to a gas at about 400° F., and have a high affinity for polyester at the activation temperature. Once the gassification bonding takes place, the ink is permanently printed and highly resistant to change or fading caused by laundry products. While sublimation dyes yield excellent results when a polyester substrate is used, these dyes have a limited affinity for other materials, such as natural fabrics like cotton and wool.

Accordingly, images produced by heat activated inks comprising sublimation dyes which are transferred onto textile materials having a cotton component do not yield the high quality image experienced when images formed by such inks are printed onto a polyester substrate. Images which are printed using sublimation dyes applied by heat and pressure onto substrates of cotton or cotton and polyester blends yield relatively poor results.

The natural tendency of the cotton fiber to absorb inks causes the image to lose its resolution and become distorted. Liquid inks other than sublimation inks wick, or are absorbed by, cotton or other absorbent substrates, resulting in printed designs of inferior visual quality, since the printed colors are not properly registered on the substrate.

To improve the quality of images transferred onto substrates having a cotton component or other absorbent component, substrates are surface coated with materials, such as the coatings described in DeVries et. al., U.S. Pat. No. 4,021,591. Application of polymer surface coating materials to the substrate allows the surface coating material to bond the ink layer to the substrate, reducing the absorbency of the ink by the cotton and improving the image quality.

Gross coverage of the substrate with the surface coating material does not match the coating to the image to be printed upon it. The surface coating material is applied to the substrate over the general area to which the image layer formed by the inks is to be applied, such as by spraying the material, or applying the material with heat and pressure from manufactured transfer sheets, which are usually rectangular in shape. To achieve full coverage of the surface coating, the area coated with the surface coating material is larger than the area covered by the ink layer. The surface coating extends from the margins of the image after the image is applied to the substrate, which can be seen with the naked eye. The excess surface coating reduces the aesthetic quality of the printed image on the substrate. Further, the surface coating tends to turn yellow with age, which is undesirable on white and other light colored substrates. Yellowing is accelerated with laundering and other exposure to heat, chemicals or sunlight. A method described in Hale, U.S. Pat. No. 5,575,877, involves printing the polymer surface coating material to eliminate the margins experienced when aerosol sprays or similar methods are used for gross application of the polymeric coating material.

Thermal transfer paper can transfer a heat-melt image to a final substrate such as cotton. However, this method has several limitations. First, the entire sheet is transferred, not just the image. Second, such papers are heavily coated with material to bind the heat-melt material on the textile. This material makes the transfer area very stiff. Finally, the laundering durability is not improved to acceptable levels. The thermal transfer paper technology (cited Foto-Wear patent) only creates a temporary bond (heat-melt) between the transfer materials and the final substrate. This bond is not durable to washing.

SUMMARY OF THE INVENTION

This invention is a formulation and method of printing an ink or meltable ink layer which comprises dyes or pigments, such as sublimation, dye diffusion, heat sensitive dyes, or other dyes, any of which may be referred to herein as colorants. The ink or ink melt layer also comprises compounds with functional groups capable of reacting with active hydrogens, such as isocyanates, and compounds with functional groups containing active hydrogens or functional groups capable of conversion to active hydrogen containing groups. Permanently bonded and/or crosslinked color images are provided by the reaction between the groups, but not until heat activation of the printed ink image.

A printer 6 prints the image onto a substrate, which may be paper, at a relatively low temperature, so that the ink is not activated during the process of printing on to the medium. The image formed by the printed ink is transferred from the substrate 9 to a final substrate 8 on which the image is to permanently appear, such as by the application of heat and pressure which activates the ink. A heat press 10 may be used to perform the transfer. FIG. 1.

Alternatively, the image may be permanently fixed on the substrate by the application of heat and pressure, without transferring the image. The process produces an image on the final substrate which is water fast and color fast.

To prevent premature or undesired reaction, the reactive compounds are blocked with blocking agents. The blocking properties of these blocking agents are removed by the application of energy or heat at a temperature which is at or above the activation temperature, and above the temperature at which printing onto the medium occurs. This higher temperature is presented during the transfer step, or the activation step, of the process, activating the ink which has been printed in an image onto the substrate. The colorant is thereby permanently bonded to the substrate in the form of the desired printed image.

DESCRIPTION OF THE PREFERRED EMBODIMENTS

Figure 1:
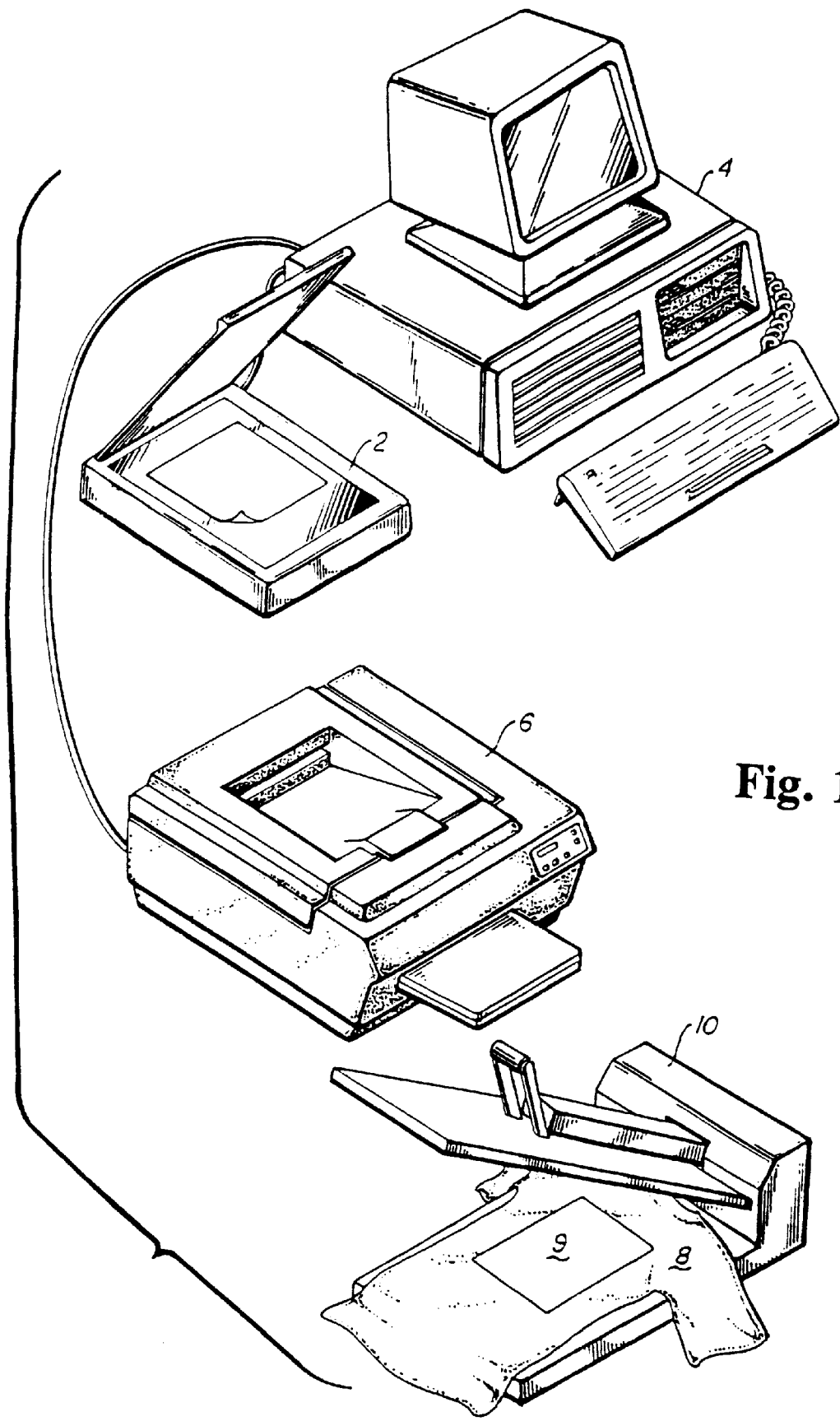
Figure 2:
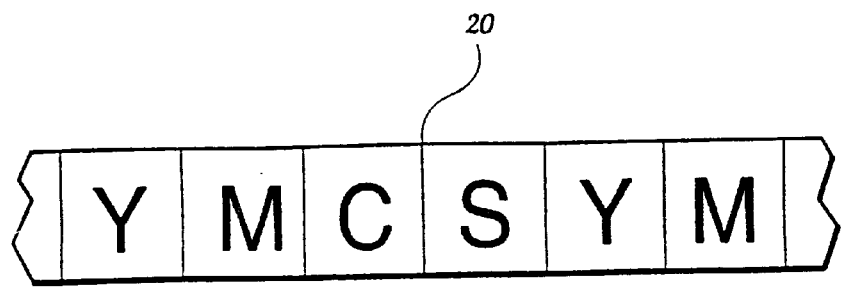

In a preferred embodiment of the present invention, a heat-melt ink ribbon 20 is formed composed of a repeating sequence of colored ink panels. A typical pattern of panels is yellow, magenta, cyan, although white, black, or other panels could be interposed. FIG. 2 Colorants used for such ink panels typically do not have an affinity for the final transfer substrate, which may be for example, natural fibers. The colorant(s) bond permanently to the final substrate by means of other components in the ink panel.

Figure 3:
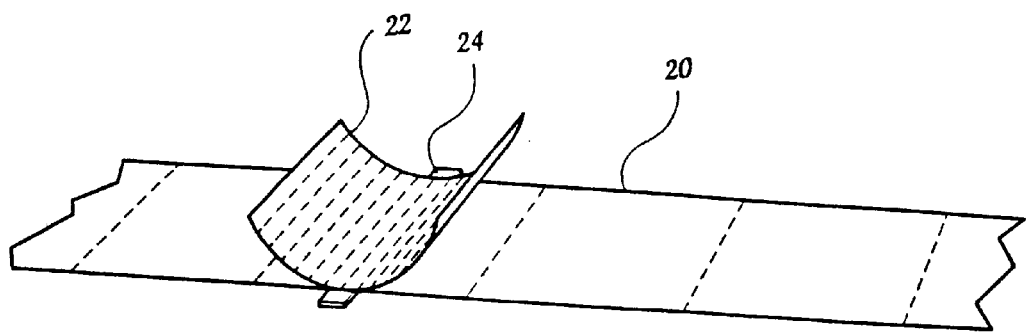

According to one embodiment of the invention, a computer designed image is first digitally melt-transfer printed from at least one ink layer onto a medium, which may be paper. For example, a thermal printer having a printer head 24 applies heat to the ribbon 20 to release the ink layer in the desired pattern. FIG. 3. The thermal printing process operates at a temperature sufficient to thermally print the multiple color ink layers, but the temperature is not sufficient to activate bonding and/or cross-linking of the ink layers, either within the ink layer itself, or between the ink layer and the printing medium. A higher temperature is applied, preferably under pressure, during the fixing or activation step to the intermediate substrate, and if used, to the final substrate, to activate and permanently fix the ink layer. The heat simultaneously activates the image, bonding and/or cross-linking the ink layer during this fixing step. In this manner, the image becomes permanently embedded in the substrate and excellent durability can be achieved for the final designed image. Appropriate pressure is applied during the transfer process to ensure the proper surface contact of the medium and the final substrate.

In an alternate embodiment of the invention, an optional additional panel of clear prime material is inserted on the ribbon ahead of the color panel sequence. The printer first prints the prime layer in the shape of the desired image or slightly beyond the image boundary onto the paper medium. The printer then prints the image in the desired colors onto the medium, so that the entire image is printed onto prime material. The image is then transferred from the medium and fixed to the substrate, by the application of heat and pressure. This layer primes the surface the printing medium, preventing permanent bonding between the ink layer and the medium, and minimizing the requirements of the printing medium. A better release of the image from the medium is thereby achieved.

To further enhance the permanent binding of the ink layer onto the final substrate, an additional optional panel of binding material may also be inserted in the color panel sequence, either ahead or behind the ink panels. The binding material may be a layer of uncolored heat activated ink. The binding material may also be a polymeric material. The printer prints the binding material in the shape of the image, or slightly beyond the image boundary, either directly onto the paper medium, or onto the printed ink image. The ink-binder image is then transferred from the medium to the substrate by the application of heat and pressure, providing enhanced binding of colorant to substrate.

Bonding and/or crosslinking of the color images of the present invention is provided by the reaction between compounds selected from each of two groups of chemicals. The first group comprises compounds with functional groups capable of reacting with active hydrogens, such as isocyanate or epoxy groups, or compounds with functional groups capable of making the isocyanate or epoxy groups available for reaction through certain initiation processes, such as blocked polyisocyanates or encapsulated polyisocyanates, which may be initiated by the application of heat. Blocking as referred to herein means chemical blocking by means of a blocking agent. A compound which is chemically blocked or physically encapsulated is referred to herein as "protected." Other initiation processes may include, but are not limited to, radiation, chemical, pressure, and/or the combinations there of.

The second group comprises compounds with functional groups containing active hydrogens, such as hydroxyl, amino, thiol, carboxylic acid groups, or functional groups capable of conversion to active hydrogen containing groups, such as carboxylic anhydrides. A preferred set of compounds comprising hydroxyl groups is referred to herein as polyols.

Aliphatic and/or cycloaliphatic and/or aromatic polyisocyanates may be used. To prevent undesired reaction of the isocyanate groups, the compounds are blocked with agents including phenols, thiols, alcohols, amines and oximes. Removal of the blocking properties must occur at a temperature which is above the operating temperature of the printer. Generally, the application of heat at a temperature which is at or above 120° C. should be required to remove such blocking groups and activate the isocyanate.

The use of polyols in the present invention meets two primary goals of the invention. As a wax-like material, it supplies the heat-melt component so that thermal digital printing of the ink layer can be achieved. The polyols also supply functional groups having active hydrogens which will cross-link with active isocyanate, and permanently bond to the final substrate.

Polyols with a polyether backbone are preferred. In general, polyols or mixtures thereof may have an average molecular weight from 500 to 50,000, and preferably, an average molecular weight in the range of 1,000 to 3,000. The resulting composition, with the rest of the components in the ink layer, is suitable for the digital printing process. The average molecular weight of the whole of all polyol compounds is defined as the sum of the product of the molecular weight and the mole fraction of each polyol compound in the mixture. A preferred embodiment of an ink layer comprises a mixture of high molecular weight polyol compounds having molecular weights of 3000 to 10,000, and low molecular weight polyol compound having molecular weights of not greater than 600.

The polyisocyanate and the polyol compounds are preferred to have an average functionality greater than or equal to two, and not greater than four. The ratio of the equivalents of isocyanate group to the equivalents of hydroxyl group may range from 1/2 to 10/1, preferably 1/1 to 2/1.

Catalysts may be included to speed up the cross-linking reaction. Organometallic compounds are suitable catalysts. Dibutyltin, 0.5% to 4% by weight, based on the isocyanate, may be used.

The colorant may be pigments or dyes. Such colorants comprise from 1%–20%, and typically 3%–10%, of the ink, by weight. Suitable dyestuffs include, but are not limited pigments to, Acid Dyes, Basic Dyes, Solvent Dyes and Disperse Dyes. The ink layer may also contain binder material. Generally binders are resins described as non-crystalline solid materials, or liquids of relatively high molecular weight which adhere the colorant to the panel of the ribbon during coating. The following resins and mixtures thereof may be incorporated into the ink panel formulation: Rosin and modified rosins, such as calcium, magnesium, and zinc metallic resinates, ester gum of rosin, maleic resins and esters, dimerized and polymerized rosins and rosin modified fumaric resins; shellac, asphalts, phenolic resins and rosin-modified phenolic resins; alkyd resins; polystyrene resins and copolymers thereof, terpene resins; alkylated urea formaldehyde resins; alkylated melamine formaldehyde resins; polyamide resins; vinyl resins and copolymers thereof, such as polyvinyl acetate, polyvinyl alcohol, ethylene-vinyl acetate, and polyvinyl butyral; ketone resins; acrylic resins, such as polyacrylic acid and polymethacrylic acid; epoxide resins; polyurethane resins; polyester resins; cellulosic resins, such as nitro cellulose, ethyl cellulose, cellulose acetate butyrate and carboxymethyl cellulose.

The final transfer substrates which are preferred are textile substrate materials containing hydroxyl groups and/or primary or secondary amino groups which react with the free isocyanate. Chemical grafting is achieved through copolymerization between the ink layer components and final substrate material, resulting in superior stability and durability. Such materials include cotton, 2° cellulose acetate, rayon, wool, silk, and polyamides such as nylon 6, nylon 66 or nylon 12.

The preferred cross-linking agents are polyisocyanates. The polyisocyanate should have a functionality greater than or equal to two, and most preferably between 2 and 4. Particularly preferred are polyisocyanates in which all the isocyanate groups are attached to aliphatic carbon atoms.

Aliphatic polyisocyanates suitable for the present invention include those having the structure

OCN—(CH2)n—NCO where n is an integer from 2 to 16, and preferably 4 or 6, i.e., tetramethylene diisocyanate and hexamethylene diisocyanate (HDI). Other suitable aliphatic isocyanates are: 1-isocyanato-3-isocyanatomethyl-3,5,5-trimethyl-cyclohexane (known commercially as isophorone diisocyanate (IPDI)), trimethylhexamethylene diisocyanate, the isomeric bis(isocyanatomethyl)-benzenes and toluenes, 1,4-bis(isocyanatomethyl)-cyclohexane, cyclohexane-1,4-diisocyanate, 4,4'-methylene bis(cyclohexylisocyanate), and the like.

Such aliphatic polyisocyanates may be used either alone, or in a mixture with one or more of the other aliphatic polyisocyanates listed above.

Examples of aromatic isocyanates suitable for the present invention are 2,4-toluene diisocyanate, 2,6-toluene diisocyanate, commercial mixtures of 2,4- and 2,6-toluene diisocyanate, 4,4'-diphenylmethane diisocyanate, dianisidiene diisocyanate, the isomeric benzene, xylene and naphthalene diisocyanates. Such aromatic polyisocyanates may be used alone or in a mixture with other aromatic polyisocyanates, such as those listed above, or with the aliphatic polyisocyanates listed above.

In place of polyisocyanates, polyisothiocyanates, or compounds containing both isocyanate and isothiocyanate groups may be used, for example, hexamethylene diisothiocyanate, tetramethylene diisothiocyanate, 2,4- and 2,6-toluene diisothiocyanate.

To prevent premature reaction of the polyisocyanates, blocked polyisocyanates may be used. A blocked isocyanate, as used herein, is derived from the reaction of a blocking agent and an isocyanate. Such blocked isocyanates reform the original isocyanate upon removal of the blocking agents such as by heating, or by heating with nucleophilic reagents, they may produce the same products as the reaction of the same nucleophilic reagents with the parent isocyanates. Typically, the unblocking reaction occurs upon the application of heat at or above 120° C.

Common examples of blocking agents include phenols and substituted phenols, alcohols and substituted alcohols, thiols, lactams such as alpha-pyrrolidone, epsilon-caprolactam, mercaptans, primary and secondary acid amides, imides, aromatic and aliphatic amines, active methylene compounds, oximes of aldehydes and ketones and salts of sulfurous acid.

Polyols suitable for use in the present invention may have a backbone structure of the polyether, polyester, polythioether, mixed polyester polyether or mixed polyether polythioether classes. However due to their superior stability to hydrolysis, those containing ether linkages alone are most preferred.

In general, the polyether polyols, or mixtures of polyether polyols, have an average molecular weight from 500 to 50,000, preferably from 1,500 to 2,700. The average molecular weight of the whole of all polyol compounds is defined as the sum of the product of the molecular weight and the mole fraction of each polyol compound in the mixture.

A preferred embodiment comprises a mixture of high molecular weight polyol compounds, having molecular weights of 3000 to 50,000, and low molecular weight polyol compounds having molecular weights of not greater than 600.

It will be appreciated by one skilled in the art that the above list of suitable diols, triols, tetrols, etc. is not exhaustive, and that other hydroxyl-containing materials may be used without departing from the spirit of the present invention.

Examples of catalysts for the isocyanate/polyol reaction include tertiary amines, such as triethylamine, triethylenediamine, hexahydro-N,N'-dimethyl aniline, tribenzylamine, N-methyl-piperidine, N,N'-dimethylpiperazine; alkali or alkaline earth metal hydroxides; heavy metal ions, such as iron(III), manganese(III), vanadium(V) or metal salts such as lead oleate, lead-2-ethylhexanoate, zinc(II)octanoate, lead and cobalt napththenate, zinc(II)-ethylhexanoate, dibutyltin dilaurate, dibutyltin diacetate, and also bismuth, antimony and arsenic compounds, for example tributyl arsenic, triethylstilbene oxide or phenyidichlorostilbene. Particularly preferred are dibutyl tin catalysts.

Any amount of dibutyl tin catalyst may be used which will effect the intended purpose. Dibutyltin dilaurate or dibutyltin diacetate may be used in a range of 0.5 to 4% by weight, based on the weight of the isocyanate.

EXAMPLE 1

| Ink Layer Composition | (% Dry Weight) |
|---|---|
| Polyisocyanate | 15–40 |
| Polyol | 50–85 |
| Catalyst | 0.1–2 |
| Colorant | 0–10 |
| Binder | 0–20 |

A thermally expandable ink layer may be produced which comprises a foaming agent such as azodicarbonamide. Appropriate foaming agents include those which decompose upon heating to release gaseous products which cause the ink layer to expand.

A thermally expandable ink layer may be produced which comprises volatile hydrocarbons encapsulated in a microsphere which bursts upon the application of heat. The gaseous products produced upon bursting expand the ink layer.

Simultaneous expanding and crosslinking gives a three dimensional image which is permanently bound to the substrate. The height of the image is dependent on the force of the pressure which is applied during heat transfer printing.

These additives are preferred to be incorporated into a white-colored panel which is positioned adjacent to a dark substrate. The color image so produced is vibrant and visible on the dark fabric.

These additives may be used in the prime layer to assist in the release of the image from the paper.

Any, or all, of the color panels could include foaming agents. The foaming agent is preferred to have a concentration of between 0.1–2.0%.

Foaming agents that evolve gas as the result of thermal decomposition are preferably used as the foaming agent. Examples are organic expanding agents such as azo compounds, including azobisisobutyronitrile, azodicarbonamide, and diazoaminobenzene, nitroso compounds such as N,N'-dinitrosopentamethylenetetramine, N,N'-dinitroso-N,N'-dimethylterephthalamide, sulfonyl hydrazides such as benzenesulfonyl hydrazide, p-toluenesulfonyl hydrazide, p-toluenesulfonyl azide, hydrazolcarbonamide, acetone-p-sulfonyl hydrazone; and inorganic expanding agents, such as sodium bicarbonate, ammonium carbonate and ammonium bicarbonate.

Thermally expandable microcapsules are composed of a hydrocarbon, which is volatile at low temperatures, positioned within a wall of thermoplastic resin. Examples of hydrocarbons suitable for practicing the present invention are methyl chloride, methyl bromide, trichloroethane, dichloroethane, n-butane, n-heptane, n-propane, n-hexane, n-pentane, isobutane, isophetane, neopentane, petroleum ether, and aliphatic hydrocarbon containing fluorine such as Freon, or a mixture thereof.

Examples of the materials which are suitable for forming the wall of the thermally expandable microcapsule include polymers of vinylidene chloride, acrylonitrile, styrene, polycarbonate, methyl methacrylate, ethyl acrylate and vinyl acetate, copolymers of these monomers, and mixtures of the polymers of the copolymers. A crosslinking agent may be used as appropriate.

The diameter of the thermally expanded microcapsule is in the range of 0.1–300 microns, and preferably within a range of 0.3–50 microns, with a greater preference of a range of 0.5–20 microns.

What is claimed is:

1. A method of digital printing from a wax thermal ribbon, comprising the steps of:
   a. preparing a wax thermal ribbon for use in a wax thermal digital printer, said wax thermal ribbon comprising a ribbon substrate and a heat meltable reactive ink, wherein said heat meltable reactive ink comprises at least one colorant, at least one compound having at least one functional group which reacts with active hydrogen, and at least one heat meltable compound having at least one functional group containing active hydrogen which assists in binding the heat meltable reactive ink layer to the ribbon substrate;
   b. supplying said wax thermal digital printer with said wax thermal ribbon;
   c. printing an image on a substrate from said heat meltable reactive ink of said wax thermal ribbon by means of said wax thermal digital, and forming an image on said substrate by means of said heat meltable reactive ink layer without reacting said at least one compound having at least one functional group which reacts with active hydrogen and at least one heat meltable compound having at least one functional group containing active hydrogen;
   d. subsequently reacting said at least one compound having at least one functional group which reacts with active hydrogen with said at least one heat meltable compound having at least one functional group containing active hydrogen to bond said image to said substrate.

2. A method of digital printing from a wax thermal ribbon, comprising the steps of:
   a. preparing a wax thermal ribbon for use in a wax thermal digital printer, said wax thermal ribbon comprising a ribbon substrate and a heat meltable reactive ink layer, wherein said heat meltable reactive ink layer comprises at least one colorant, at least one compound having at least one functional group which reacts with active hydrogen, at least one heat meltable compound having at least one functional group containing active hydrogen which assists in binding the heat meltable reactive ink layer to the ribbon substrate, and at least one thermally removable blocking agent for blocking a reaction between said at least one compound having at least one functional group which reacts with active hydrogen, and at least one heat meltable compound having at least one functional group containing active hydrogen;
   b. supplying said wax thermal digital printer with said wax thermal ribbon;
   c. printing an image on a substrate from said heat meltable reactive ink layer of said wax thermal ribbon by means of said wax thermal digital printer at a temperature which is below the activation temperature of said thermally removable blocking agent, and at a temperature which is above the melting temperature of at least one heat meltable compound having at least one functional group containing active hydrogen, and forming an image on said substrate by means of said heat meltable reactive ink layer without reacting said at least one compound having at least one functional group which reacts with active hydrogen and at least one heat meltable compound having at least one functional group containing active hydrogen;

d. subsequently applying heat to said image at a temperature which is above the activation temperature of said thermally removable blocking agent, wherein said thermally removable blocking agent activates and permits reaction of said at least one compound having at least one functional group which reacts with active hydrogen with said at least one heat meltable compound having at least one functional group containing active hydrogen to bond said image to said substrate.

3. A method of digital printing as described in claim 1, wherein said ink further comprises a blocking agent which, during printing of said ink, prevents a reaction between said at least one compound having at least one functional group which reacts with active hydrogen, and said at least one compound having at least one functional group containing active hydrogen, and thereafter, upon the application of sufficient heat, said blocking agent is removed.

4. A method of digital printing as described in claim 1, wherein said at least one compound having at least one functional group which reacts with active hydrogen is an isocyanate.

5. A method of digital printing as described in claim 1, wherein said at least one compound having at least one functional group containing active hydrogen is a polyol.

6. A method of digital printing as described in claim 1, wherein said at least one compound having at least one functional group which reacts with active hydrogen is an epoxide.

7. A method of digital printing as described in claim 1, wherein said at least one compound having at least one functional group containing active hydrogen is an anhydride.

8. A method of digital printing as described in claim 1, wherein the image so printed is transferred from said substrate to a second substrate.

9. A method of digital printing as described in claim 2, wherein said at least one compound having at least one functional group which reacts with active hydrogen is an isocyanate.

10. A method of digital printing as described in claim 2, wherein said at least one compound having at least one functional group containing active hydrogen is a polyol.

11. A method of digital printing as described in claim 2, wherein said at least one compound having at least one functional group which reacts with active hydrogen is an epoxide.

12. A method of digital printing as described in claim 2, wherein said at least one compound having at least one functional group containing active hydrogen is an anhydride.

13. A method of digital printing as described in claim 2, wherein the image so printed is transferred from said substrate to a second substrate.

* * * * *

UNITED STATES PATENT AND TRADEMARK OFFICE
CERTIFICATE OF CORRECTION

PATENT NO : 6,103,041
DATED : August 15, 2000
INVENTOR(S): Wagner, et al

It is certified that error appears in the above-identified patent and that said Letters Patent are hereby corrected as shown below:

Inventors should be corrected to read as follows:
Kimberlee Thompson, 1054 Anna Knapp Blvd., Apt 23D;
Barbara Wagner, 1477 Oaklanding Rd.; Ming Xu, 2808
Gatson Gate, all of Mt. Pleasant, SC 29464

Assignee: Sawgrass Systems, Inc., Mt. Pleasant, SC 29464

Signed and Sealed this

Eighth Day of May, 2001

Attest:

NICHOLAS P. GODICI

Attesting Officer

Acting Director of the United States Patent and Trademark Office